US012558963B2

(12) United States Patent
Lee

(10) Patent No.: US 12,558,963 B2
(45) Date of Patent: Feb. 24, 2026

(54) VEHICLE DISPLAY APPARATUS

(71) Applicant: HYUNDAI MOBIS CO., LTD., Seoul (KR)

(72) Inventor: Hyun Seong Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 48 days.

(21) Appl. No.: 18/417,580

(22) Filed: Jan. 19, 2024

(65) Prior Publication Data

US 2025/0100385 A1     Mar. 27, 2025

(30) Foreign Application Priority Data

Sep. 21, 2023    (KR) ........................ 10-2023-0126372

(51) Int. Cl.
*B60K 35/22*          (2024.01)
*B60K 37/20*          (2024.01)
*B60R 11/02*          (2006.01)

(52) U.S. Cl.
CPC .......... *B60K 37/20* (2024.01); *B60R 11/0235* (2013.01); *B60K 2360/46* (2024.01); *B60K 2360/691* (2024.01); *B60K 2360/816* (2024.01); *B60K 2360/828* (2024.01); *B60K 2360/84* (2024.01)

(58) Field of Classification Search
CPC ................ B60K 37/20; B60K 2360/46; B60K 2360/691; B60K 2360/816; B60K 2360/828; B60K 2360/84; B60K 2360/128; B60K 35/22; B60K 35/10; B60K 35/00; B60K 35/50; B60R 11/0235; B60Y 2400/92
See application file for complete search history.

(56) References Cited

U.S. PATENT DOCUMENTS

| | | | | |
|---|---|---|---|---|
| 5,169,097 A | * | 12/1992 | Yasukawa | B60R 11/02 312/7.1 |
| 6,494,527 B1 | * | 12/2002 | Bischoff | B60H 1/00985 348/E5.128 |
| 6,529,381 B1 | * | 3/2003 | Schoenfish | B60R 11/0241 248/128 |
| 8,783,767 B2 | * | 7/2014 | Wood | B60R 11/0235 297/217.4 |
| 11,607,957 B1 | * | 3/2023 | Diaz | B60K 35/22 |
| 2001/0016432 A1 | * | 8/2001 | Yamauchi | B60R 11/02 439/34 |
| 2001/0042812 A1 | * | 11/2001 | Perzewski | B60R 11/0252 248/27.1 |
| 2002/0056614 A1 | * | 5/2002 | Amari | H01H 13/70 200/5 D |
| 2002/0171627 A1 | * | 11/2002 | Noguchi | B60K 35/10 345/184 |
| 2003/0142064 A1 | * | 7/2003 | Wang | F16M 11/18 345/156 |

(Continued)

*Primary Examiner* — John R Schnurr
(74) *Attorney, Agent, or Firm* — MORGAN, LEWIS & BOCKIUS LLP

(57) ABSTRACT

An embodiment discloses a vehicle display apparatus including a display panel, a housing in which the display panel is fixed and which is detachably installed on a holder provided on a dashboard of a vehicle, and a keyboard module provided with switches to operate the display panel and detachably coupled to the housing.

13 Claims, 8 Drawing Sheets

(56)        References Cited

U.S. PATENT DOCUMENTS

| | | | | |
|---|---|---|---|---|
| 2005/0099553 | A1* | 5/2005 | Wu | B60K 35/22 |
| | | | | 349/58 |
| 2005/0162376 | A1* | 7/2005 | Sunoue | B60R 11/0235 |
| | | | | 345/104 |
| 2006/0070102 | A1* | 3/2006 | Vitito | B60K 35/81 |
| | | | | 725/77 |
| 2006/0209261 | A1* | 9/2006 | Tak | B60K 35/60 |
| | | | | 353/13 |
| 2006/0237604 | A1* | 10/2006 | Tan | G06F 1/1601 |
| | | | | 248/205.3 |
| 2007/0199028 | A1* | 8/2007 | Yau | B60K 35/10 |
| | | | | 725/77 |
| 2009/0152418 | A1* | 6/2009 | Bury | B60R 11/0258 |
| | | | | 248/205.3 |
| 2010/0090870 | A1* | 4/2010 | Masuda | G01C 21/265 |
| | | | | 340/995.26 |
| 2010/0121570 | A1* | 5/2010 | Tokue | G01C 21/3688 |
| | | | | 701/532 |
| 2010/0161220 | A1* | 6/2010 | Masuda | B60R 11/02 |
| | | | | 701/532 |
| 2010/0165219 | A1* | 7/2010 | Ikunami | G06F 1/1656 |
| | | | | 348/836 |
| 2011/0109555 | A1* | 5/2011 | Miller | B60K 35/10 |
| | | | | 345/167 |
| 2012/0063081 | A1* | 3/2012 | Grunwald | B60R 11/0235 |
| | | | | 361/679.41 |
| 2012/0170178 | A1* | 7/2012 | Chen | G02F 1/1306 |
| | | | | 361/679.01 |
| 2014/0361569 | A1* | 12/2014 | Crepaldi | B60R 11/0252 |
| | | | | 296/37.12 |
| 2015/0321558 | A1* | 11/2015 | Solomon | B60K 35/81 |
| | | | | 701/526 |
| 2016/0114736 | A1* | 4/2016 | Tranchina | H04B 1/082 |
| | | | | 348/837 |
| 2016/0164561 | A1* | 6/2016 | Brey | B60K 35/22 |
| | | | | 455/73 |
| 2017/0282812 | A1* | 10/2017 | Yoshimura | H05K 5/0204 |
| 2018/0038543 | A1* | 2/2018 | Barnes | F16M 11/041 |
| 2019/0248298 | A1* | 8/2019 | Barnes | B64D 11/00152 |
| 2019/0386887 | A1* | 12/2019 | Ricci | B60W 40/08 |
| 2021/0023949 | A1* | 1/2021 | Marietta | B60K 35/53 |
| 2022/0219540 | A1* | 7/2022 | Hagen | B60K 35/10 |
| 2022/0344112 | A1* | 10/2022 | Kleine-Hollenhorst | |
| | | | | H01H 13/04 |
| 2023/0028186 | A1* | 1/2023 | Park | B60K 35/22 |
| 2023/0112001 | A1* | 4/2023 | Ikumi | H05K 5/0217 |
| | | | | 361/679.01 |
| 2023/0116821 | A1* | 4/2023 | Ikumi | B60K 37/20 |
| | | | | 361/807 |
| 2023/0364993 | A1* | 11/2023 | Diaz | B60K 35/60 |
| 2023/0365259 | A1* | 11/2023 | Vazquez | B64D 11/00152 |
| 2023/0388613 | A1* | 11/2023 | Liu | H04N 23/531 |
| 2024/0166143 | A1* | 5/2024 | Ive | B60K 35/22 |
| 2024/0284630 | A1* | 8/2024 | Kubotera | H05K 7/20145 |
| 2025/0053038 | A1* | 2/2025 | Li | B60K 35/22 |
| 2025/0100379 | A1* | 3/2025 | Harmon | B60K 35/85 |
| 2025/0107026 | A1* | 3/2025 | Harmon | B60K 35/80 |

* cited by examiner

[FIG. 1]
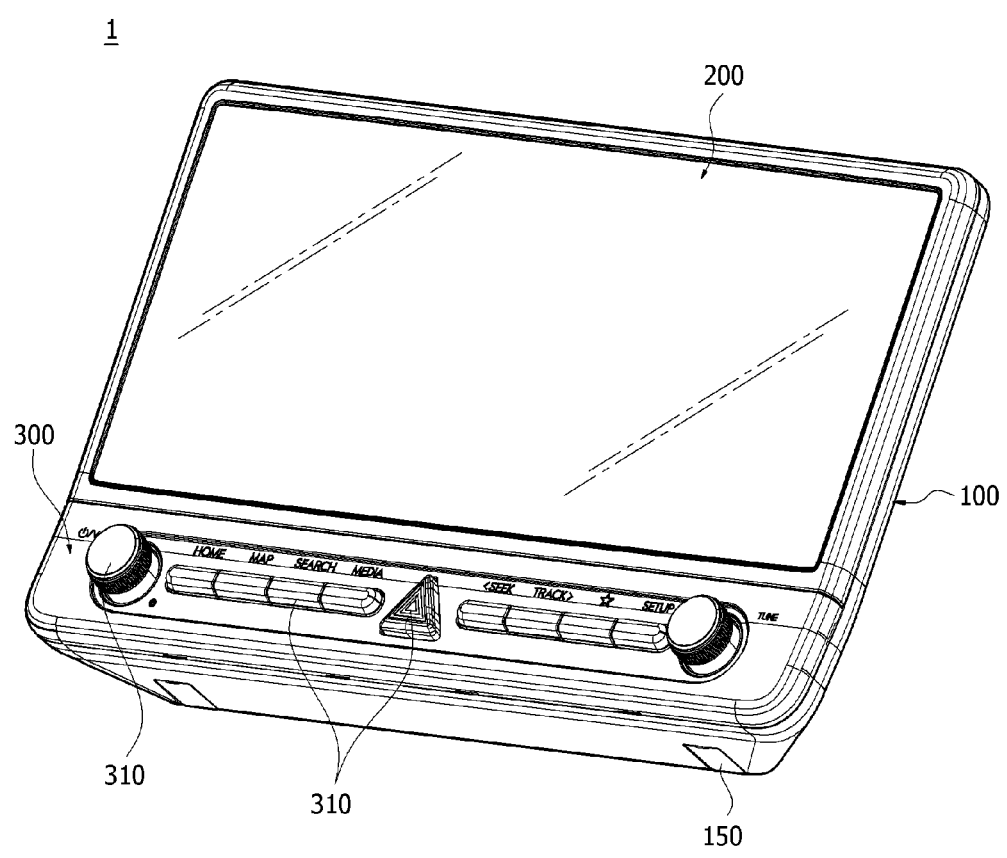

[FIG. 2]
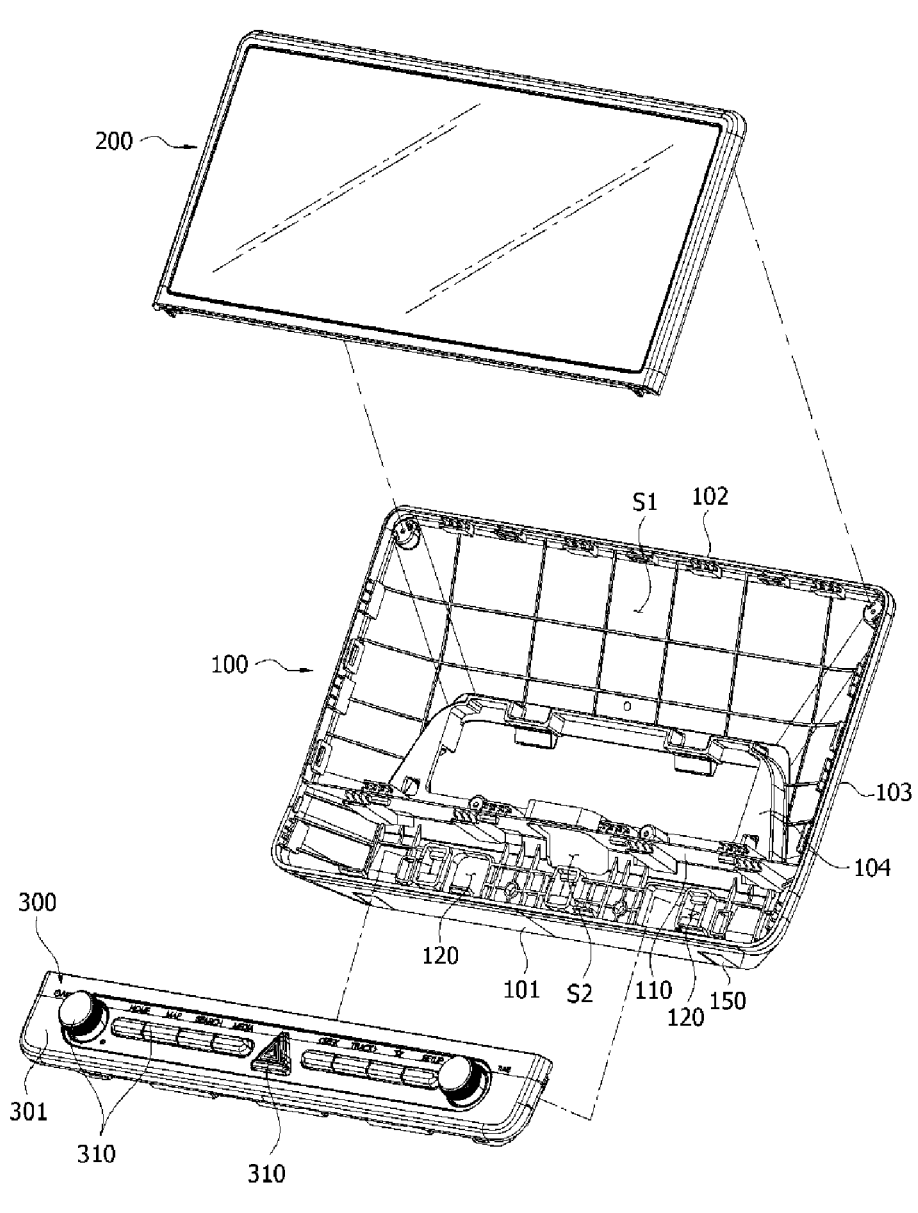

[FIG. 3]
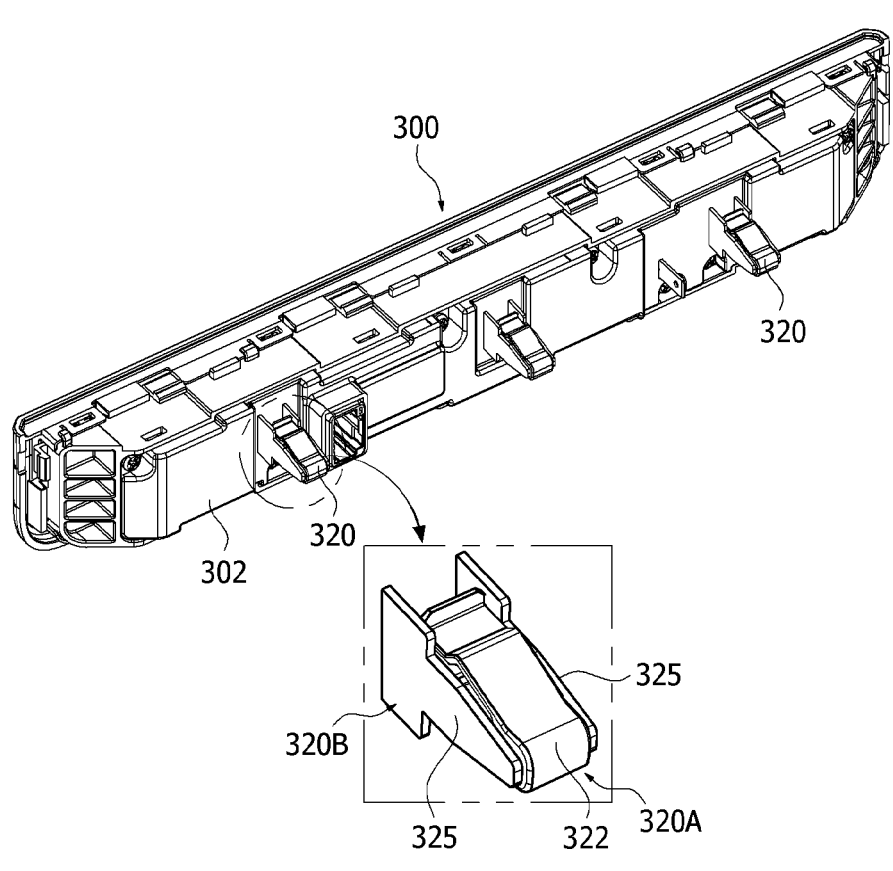

[FIG. 4]
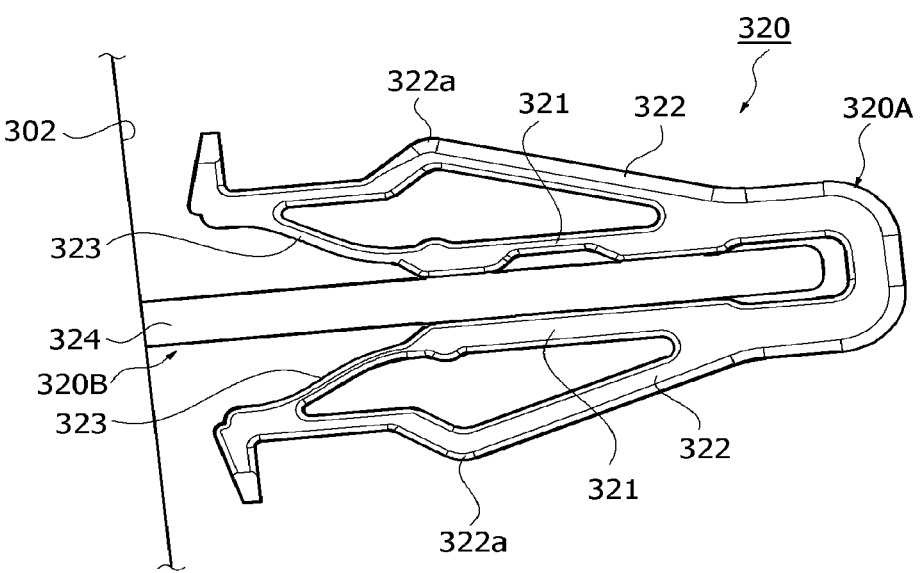

[FIG. 5]
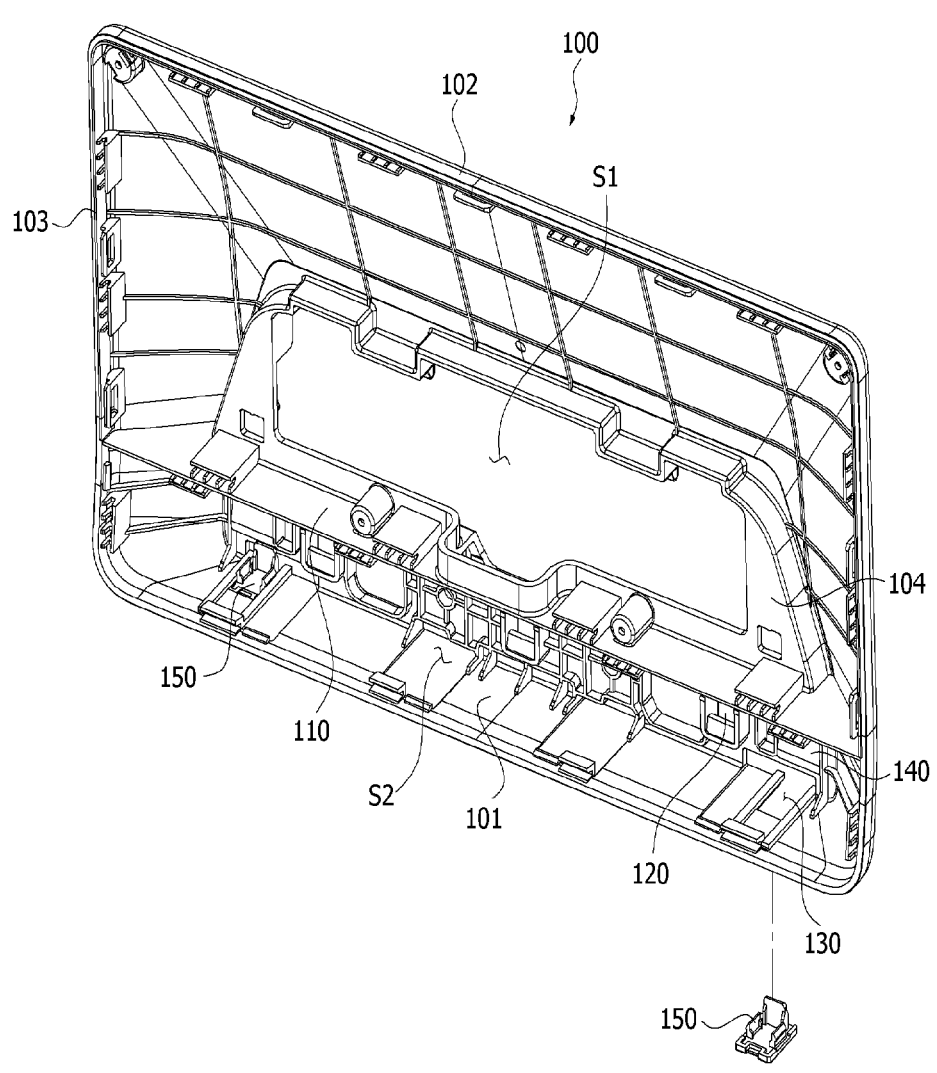

[FIG. 6]
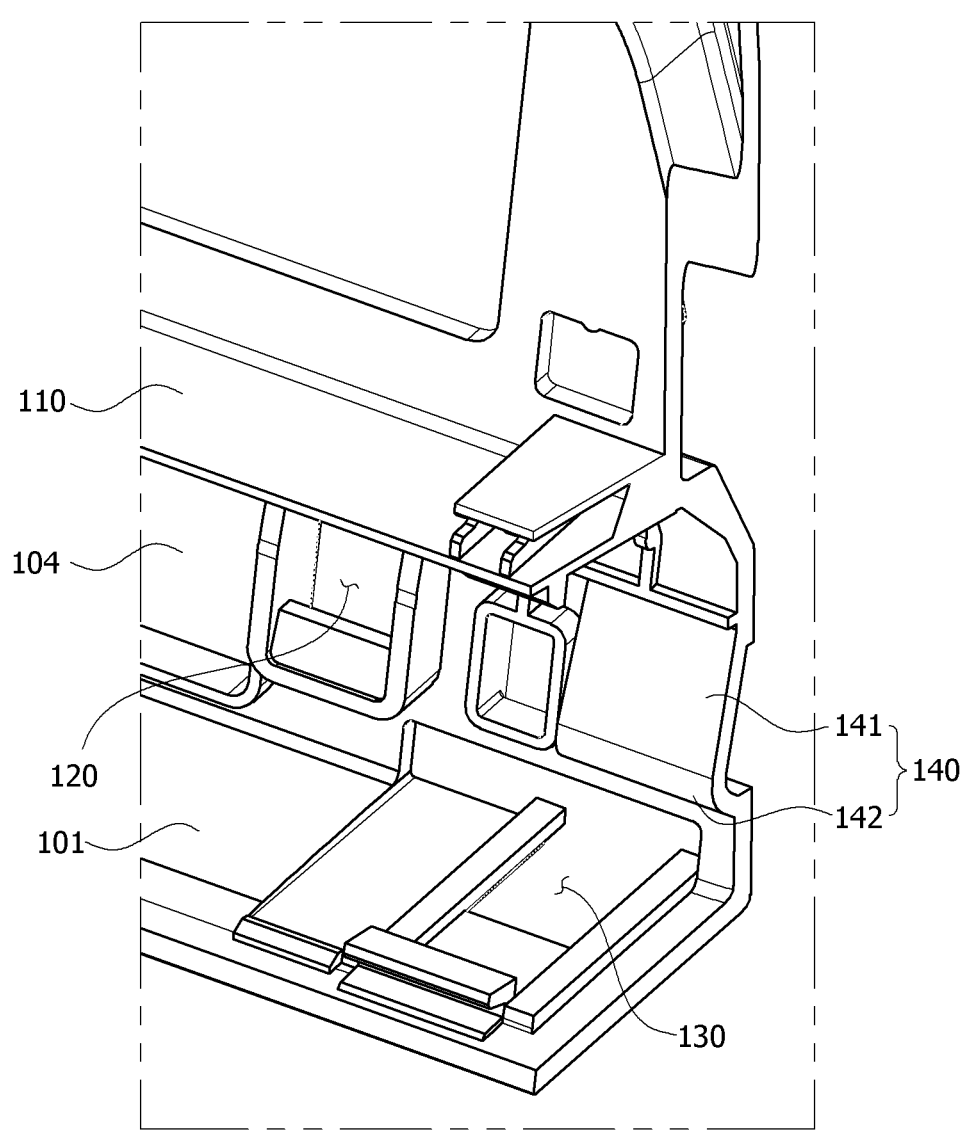

[FIG. 7A]
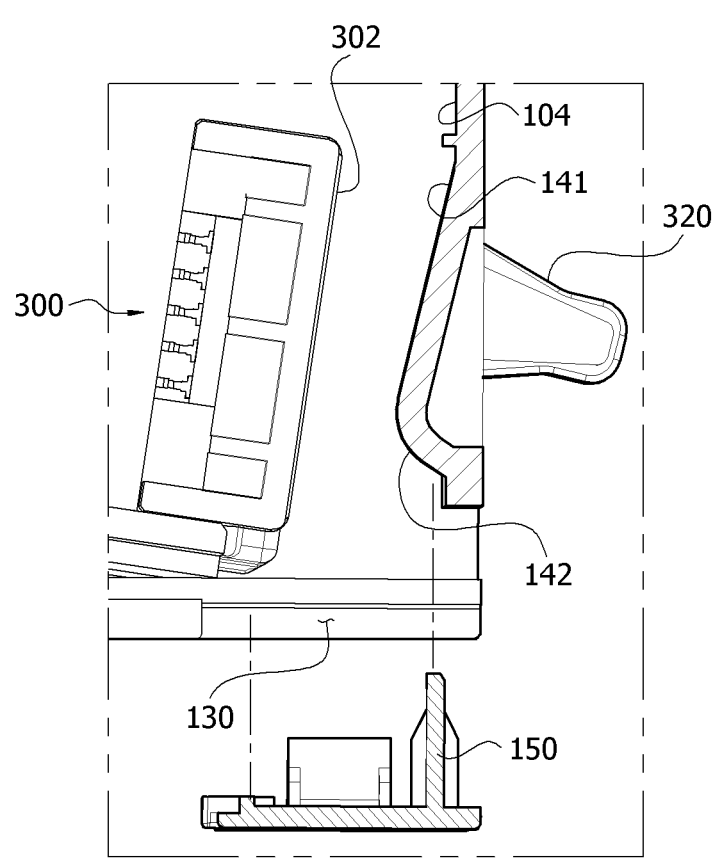

[FIG. 7B]
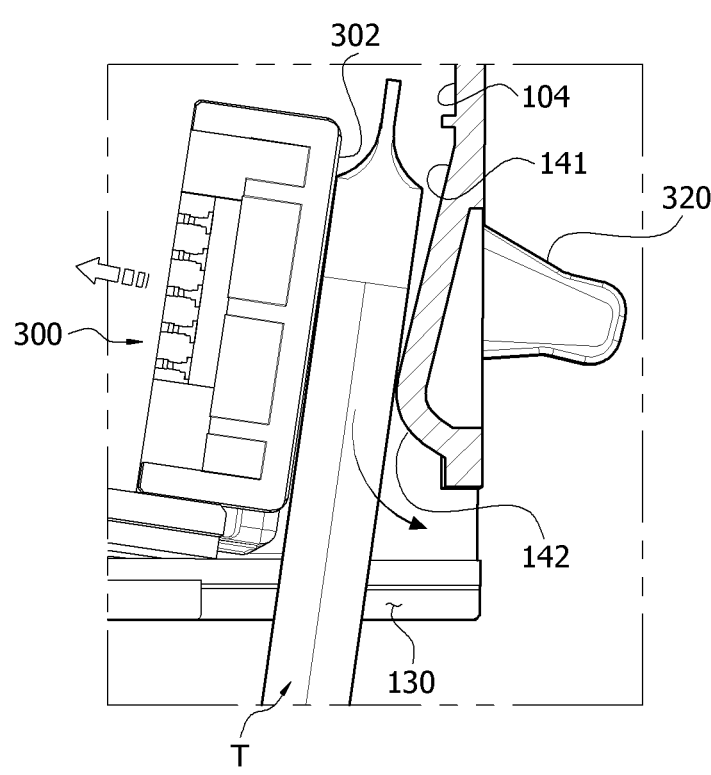

VEHICLE DISPLAY APPARATUS

CROSS-REFERENCE TO RELATED APPLICATION

The present application claims priority and the benefit of Korean Patent Application No. 10-2023-0126372, filed on Sep. 21, 2023 in the Korean Intellectual Property Office, the entire disclosure of which is incorporated herein by reference in its entirety for all purposes.

BACKGROUND

1. Field of the Invention

The present invention relates to a vehicle display device.

2. Discussion of Related Art

In general, as vehicles become more sophisticated, the number of vehicles with audio, video, navigation (AVN) systems embedded and fixed in a dashboard is gradually increasing.

In order to ensure driver convenience, the AVN system provides more convenience to drivers by providing TV broadcasts while a vehicle is moving or by displaying map information with the introduction of a navigation system. Additionally, the AVN system is provided with a display device that displays information related to the AV or navigation system so that the drivers can visually recognize necessary information.

The display device includes a monitor corresponding to a display unit and a keyboard corresponding to an input and operating unit.

However, in a structure in which the monitor and keyboard are integrated, it is practically impossible to apply a keyboard of different specifications depending on a vehicle model and AVN system specifications, and there is the inconvenience of having to replace it along with the monitor.

Therefore, there is a need to solve the above problems.

SUMMARY OF THE INVENTION

The present invention is directed to providing a vehicle display device that includes a monitor and keyboard separately so that only the keyboard or monitor may be selectively separated and replaced, and in particular, that allows the keyboard to be easily replaced using a tool when the keyboard is disassembled.

The object of the present invention is not limited to the problems described above, and other problems not described can be clearly understood by those skilled in the art from the description below.

According to an embodiment of the present invention, a vehicle display device may include a display panel, a housing in which the display panel is fixed and which is detachably installed on a holder provided on a dashboard of a vehicle, and a keyboard module provided with switches to operate the display panel and detachably coupled to the housing.

The housing may have a through hole formed in a lower surface and connected to an internal space in which the keyboard module is assembled, and in a state in which the keyboard module is assembled in the internal space, the through hole may be positioned below a rear surface of the keyboard module, and a tool inserted into the internal space through the through hole may be disposed between the rear surface of the keyboard module and a rear surface of the housing.

The through hole may be provided as a structure extending from the rear surface of the housing toward an open front surface of the housing having the internal space.

The housing may be provided with a tool support protruding toward the internal space at an inner side of the rear surface thereof, and the tool support may be positioned above the through hole.

The tool support may include a first body that extends obliquely downward from the rear surface of the housing toward the through hole and a second body that is bent at a lower portion of the first body and extends to form a curved surface toward the rear surface of the housing.

The housing may include a tool cover that is detachably fitted into the through hole and covers the through hole.

A rear surface of the keyboard module may be disposed on the lower surface of the housing at an acute angle.

The keyboard module may include an elastic clip, which is coupled to a coupling hole formed in a rear surface of the housing, on the rear surface thereof.

The elastic clip may include a clip boss protruding from the rear surface of the keyboard module and a clip body fitted onto the clip boss, and the clip body may pass through the coupling hole and be elastically deformed to be caught and fixed in the coupling hole or come out of the coupling hole.

The clip body may include a pair of inner elastic pieces disposed in parallel and having front ends connected to each other, outer elastic pieces that extend obliquely from an outside of the front ends of the inner elastic pieces and have locking hooks, and connecting links that connect rear ends of the inner elastic pieces and rear ends of the outer elastic pieces, and the clip boss may include a rib inserted between the inner elastic pieces to fix the clip body, and a pair of side plates disposed on left and right sides of the rib.

BRIEF DESCRIPTION OF THE DRAWINGS

FIG. 1 is a view illustrating a vehicle display device according to an embodiment of the present invention.

FIG. 2 is a view illustrating a configuration of the vehicle display device in FIG. 1.

FIG. 3 is a view illustrating a keyboard module having an elastic clip in the vehicle display device.

FIG. 4 is a cross-sectional view illustrating the elastic clip.

FIG. 5 is a view illustrating an internal space of a housing.

FIG. 6 is a view illustrating a through hole and a tool support in the housing.

FIGS. 7A and 7B are views illustrating a process of separating a keyboard module assembled from the housing using a tool.

DETAILED DESCRIPTION OF EXEMPLARY EMBODIMENTS

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Hereinafter, embodiments of the present invention will be described in detail with reference to the accompanying drawings, and components which are the same or correspond to each other will be denoted by the same or corresponding reference numerals in all drawings, and redundant descriptions will be omitted.

FIG. 1 is a view illustrating a vehicle display device according to an embodiment of the present invention, FIG. 2 is a view illustrating a configuration of the vehicle display device in FIG. 1, FIG. 3 is a view illustrating a keyboard module having an elastic clip in the vehicle display device, and FIG. 4 is a cross-sectional view illustrating the elastic clip. FIG. 5 is a view illustrating an internal space of a housing, FIG. 6 is a view illustrating a through hole and a tool support in the housing, and FIGS. 7A and 7B are views illustrating a process of separating a keyboard module assembled from the housing using a tool.

Referring to the drawings, the vehicle display device 1 according to the embodiment of the present invention may include a housing 100, a display panel 200, and a keyboard module 300.

The housing 100 may be detachably installed in a holder (not shown) provided on a dashboard of a vehicle.

The housing 100 may have a substantially quadrangular box-shaped structure including a lower surface 101, an upper surface 102, side surfaces 103, a rear surface 104, and an open front surface.

The housing 100 may have the internal space S in which the display panel 200 and to which the keyboard module 300 are assembled. The internal space S may be divided into a first space S1 at an upper side and a second space S2 at a lower side by a partition 110. The display panel 200 may be assembled in the first space S1, and the keyboard module 300 may be assembled in the second space S2.

The display panel 200 may be assembled and fixed to the housing 100 and form a monitor.

The display panel 200 may be assembled in the housing 100 and connected to a control device (not shown) installed inside the dashboard of the vehicle.

The keyboard module 300 may be detachably coupled to the housing 100 and disposed below the display panel 200.

In the embodiment, the keyboard module 300 is illustrated as being disposed below the display panel 200, but is not limited thereto. Depending on a design of the display device 1, the position where the keyboard module 300 is disposed may be changed in various ways.

Referring to FIGS. 2 to 4, the keyboard module 300 may be provided with a switch 310 on a front surface 301 that operates the display panel 200. The switch 310 may include a push button that a user presses and applies a physical force to, a jog dial that rotates left and right or up and down while held by the user, a knob, etc.

Additionally, the keyboard module 300 may be provided with an elastic clip 320 on a rear surface 302 coupled to a coupling hole 120 formed in the rear surface 104 of the housing 100.

The elastic clip 320 may be provided as a plurality of elastic clips and disposed on the rear surface 302 of the keyboard module 300 to be spaced apart from each other in a longitudinal direction.

As shown in the drawings, the elastic clip 320 may include a clip boss 320B protruding from the rear surface 302 of the keyboard module 300 and a clip body 320A fitted onto the clip boss 320B.

The clip body 320A may include a pair of inner elastic pieces 321 disposed in parallel and having front ends connected to each other, outer elastic pieces 322 that extend obliquely from the outside of the front ends of the inner elastic pieces 321 and have locking hooks 322a, and connecting links 323 that connect rear ends of the inner elastic pieces 321 and rear ends of the outer elastic pieces 322.

The clip boss 320B may include a rib 324 inserted between the inner elastic pieces 321 to fix the clip body 320A, and a pair of side plates 325 disposed on left and right sides of the rib 324.

The clip body 320A fitted onto the rib 324 of the clip boss 320B may pass through the coupling hole 120 of the housing 100 and be elastically deformed to be caught and fixed in the coupling hole 120 or come out of the coupling hole 120.

In detail, when the outer elastic pieces 322 move forward and are inserted into the coupling hole 120 while the inner elastic pieces 321 are supported by the rib 324 disposed between the pair of inner elastic pieces 321, the outer elastic pieces 322 are retracted toward the inner elastic pieces 321, pass through the coupling hole 120, and then return to their original state. Accordingly, the locking hook 322a is caught in the coupling hole 120, and the clip body 320A is caught and fixed in the coupling hole 120.

Accordingly, the keyboard module 300 is assembled with the housing 100 by being pushed into the housing 100 through the elastic clip 320, which has the advantage of allowing an assembly process to proceed more quickly and easily than using general screws. That is, assembly is accomplished by simple pressurization, which reduces assembly man-hours and improves workability.

Meanwhile, in order to disassemble the keyboard module 300 from the housing 100, a through hole 130 and a tool support 140 may be formed in the housing 100.

As shown in FIGS. 5 and 6, the housing 100 may have a through hole 130 formed in the lower surface 101 and connected to the internal space S in which the keyboard module 300 is assembled.

In a state in which the keyboard module 300 is assembled in the internal space S, the through hole 130 may be positioned below the rear surface 302 of the keyboard module 300. Therefore, a tool T inserted into the internal space S through the through hole 130 is disposed between the rear surface 302 of the keyboard module 300 and the rear surface 104 of the housing 100. Here, the tool T may include a common flat screwdriver. However, the tool T is not limited thereto, and any long bar structure may be used as the tool T.

The through hole 130 may be provided as a structure extending from the rear surface 104 of the housing 100 toward the open front surface of the housing having the internal space S. Also, the rear surface 302 of the keyboard module 300 may be obliquely disposed on the lower surface 101 of the housing 100 at an acute angle when assembled in the internal space S. That is, the rear surface 302 of the keyboard module 300 may be disposed not parallel to and obliquely on the rear surface 104 of the housing 100.

The housing 100 may be provided with the tool support 140 that protrudes toward the internal space S at an inner side of the rear surface 104. The tool support 140 may be positioned above the through hole 130.

The tool support 140 includes a first body 141 that extends obliquely downward from the rear surface 104 of the housing 100 toward the through hole 130 and a second body 142 that is bent at a lower portion of the first body 141 and extends to form a curved surface toward the rear surface 104 of the housing 100.

As shown in FIGS. 6 and 7, an inclined surface implemented by the first body 141 faces the inclined rear surface 302 of the keyboard module 300, and the tool T inserted into the internal space S through the through hole 130 may be disposed between the rear surface 302 of the keyboard module 300 and the inclined surface of the first body 141.

When the tool T is disposed in this way and the tool T is rotated along the second body 142 about a part where the first body 141 is connected to the second body 142, the keyboard module 300 is pushed by the tool T in contact with the rear surface 302, moves to the open front surface of the housing 100, and is separated from the housing 100. That is, workability can be improved by configuring the keyboard module 300 to be separated by pressing the keyboard module 300 using the lever principle.

Also, when the outer elastic pieces 322 move backward from the coupling hole 120, the elastic clip 320, which fixes the keyboard module 300 to the housing 100, retracts, passes through the coupling hole 120, and comes out of the coupling hole 120, and thus the keyboard module 300 and the housing 100 are uncoupled.

Therefore, the keyboard module 300 may be separated from the housing 100 by simply rotating the tool T placed between the keyboard module 300 and the tool support 140, which has the advantage of making replacement of the keyboard module 300 easy and simple.

In particular, since the through hole 130 into which the tool T is inserted is provided in the lower surface 101 of the housing 100, which is invisible to a user, there is an advantage of not impairing the design.

In addition, since the tool T is in contact with the relatively inexpensive keyboard module 300 through the partition 110 and not in contact with the relatively expensive display panel 200, the problem of damage to the display panel 200 does not occur. In addition, since a structure in which the keyboard module 300 is pressed using the lever principle, there is an advantage that the problem of the keyboard module 300 being damaged does not occur.

In an embodiment, the housing 100 may include a tool cover 150 that is detachably fitted into the through hole 130 and covers the through hole 130.

The tool cover 150 may cover the through hole 130 to prevent external foreign substances from entering the internal space S.

The tool cover 150 is fixed by being fitted into the through hole 130 with a hook structure and easily disassembled using the tool T, such as a flat screwdriver.

According to the present invention, there is provided a vehicle display device including a monitor and keyboard separately so that only the keyboard or monitor can be selectively separated and replaced, and in particular, that allows the keyboard to be easily replaced using a tool when the keyboard is disassembled.

The effects of the present invention are not limited to the effects described above, and other effects not described will be clearly understood by those skilled in the art from the description of the claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A vehicle display apparatus comprising:

a display panel;

a housing in which the display panel is fixed and which is detachably installed on a holder provided on a dashboard of a vehicle; and a keyboard module including switches to operate the display panel and detachably coupled to the housing, wherein the housing includes a through hole formed in a lower surface of the housing and connected to an internal space of the housing in which the keyboard module is assembled, and wherein the through hole is configured that a tool is inserted into the internal space through the through hole to remove the keyboard module from the housing, and wherein the housing further includes a tool support protruding toward the internal space at an inner side of a rear surface of the housing and supporting the tool when the tool is inserted into the internal space and engaged to the tool support.

2. The vehicle display apparatus of claim 1, wherein the housing includes a partition to divide the internal space of the housing into a first space at an upper side and a second space at a lower side of the housing, and wherein the display panel is mounted in the first space, and the keyboard module is mounted in the second space.

3. The vehicle display apparatus of claim 1, wherein in a state in which the keyboard module is assembled in the internal space, the through hole is positioned below a rear surface of the keyboard module, and the tool inserted into the internal space through the through hole is disposed between the rear surface of the keyboard module and the rear surface of the housing.

4. The vehicle display apparatus of claim 1, wherein the through hole extends from the rear surface of the housing toward an open front surface of the housing having the internal space.

5. The vehicle display apparatus of claim 1, wherein the tool support is positioned above the through hole.

6. The vehicle display apparatus of claim 1, wherein the tool support includes:

a first body that extends obliquely downward from the rear surface of the housing toward the through hole; and a second body that is bent at a lower portion of the first body and extends to form a curved surface toward the rear surface of the housing.

7. The vehicle display apparatus of claim 1, wherein the housing further includes a tool cover that is detachably fitted into the through hole and covers the through hole.

8. The vehicle display apparatus of claim 1, wherein a rear surface of the keyboard module is obliquely disposed on the lower surface of the housing at an acute angle.

9. The vehicle display apparatus of claim 8, wherein the keyboard module includes an elastic clip, which is coupled to a coupling hole formed in the rear surface of the housing, on the rear surface of the housing.

10. The vehicle display apparatus of claim 9, wherein the elastic clip includes a clip boss protruding from the rear surface of the keyboard module and a clip body fitted onto the clip boss, and wherein the clip body passes through the coupling hole by an external force and is elastically deformed to be caught and fixed in the coupling hole or comes out of the coupling hole by the external force.

11. The vehicle display apparatus of claim 10, wherein the clip body includes:

a pair of inner elastic pieces disposed in parallel and having front ends connected to each other;

outer elastic pieces that extend obliquely from an outside of the front ends of the inner elastic pieces and includes locking hooks; and connecting links that connect rear ends of the inner elastic pieces and rear ends of the outer elastic pieces, and wherein the clip boss includes a rib inserted between the inner elastic pieces to fix the clip body.

12. The vehicle display apparatus of claim 11, wherein each of the locking hooks is configured to be caught in a corresponding coupling hole and the clip body is caught and fixed in the corresponding coupling hole.

13. The vehicle display apparatus of claim 11, wherein the clip body further includes a pair of side plates disposed on left and right sides of the rib.

* * * * *